(12) United States Patent
Shingai et al.

(10) Patent No.: US 6,725,188 B1
(45) Date of Patent: Apr. 20, 2004

(54) METHOD OF CLEANUP AFTER TERMINATION OF A PROCESS UNDER A SIMULATED OPERATING SYSTEM

(75) Inventors: Randall Ko Shingai, San Jose, CA (US); Jeffrey D. Merrick, Mountain View, CA (US); James R. Smullen, Carmel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/541,237

(22) Filed: Apr. 3, 2000

(51) Int. Cl.[7] ................................................. G06F 9/45
(52) U.S. Cl. ........................ 703/22; 718/100; 717/135
(58) Field of Search ............................... 703/22, 26, 27; 717/124–138

(56) References Cited

U.S. PATENT DOCUMENTS

| | | | | |
|---|---|---|---|---|
| 5,404,529 A | * | 4/1995 | Chernikoff et al. | 709/303 |
| 5,901,319 A | * | 5/1999 | Hirst | 395/710 |
| 6,173,249 B1 | * | 1/2001 | Huang et al. | 703/27 |
| 6,189,023 B1 | * | 2/2001 | Emlich et al. | 709/100 |
| 6,292,820 B1 | * | 9/2001 | Korn | 709/100 |
| 6,330,528 B1 | * | 12/2001 | Huang et al. | 703/22 |
| 6,466,898 B1 | * | 10/2002 | Chan | 703/17 |

* cited by examiner

Primary Examiner—George L Opie

(57) ABSTRACT

An operating system is simulated to run in conjunction with a native operating system, allowing processes originally developed for the operating system being simulated to be ported to the environment of the native operating system with a minimum of effort. Ported processes will consume resources of both operating systems, the native operating system and the simulated operating system, that are cleaned or otherwise removed when the ported process ends by setting up a monitoring facility to detect when the ported process ends. When that occurs, the simulated operating system resources are cleaned by a cleanup process that impersonates the ported process that ended. The cleanup process is also monitored, so that when it ends, additional cleanup processes are called into action to cleanup the system resources of the remaining simulated operating system used by the ported process that ended, and the system resources used by the cleanup process.

9 Claims, 2 Drawing Sheets

METHOD OF CLEANUP AFTER TERMINATION OF A PROCESS UNDER A SIMULATED OPERATING SYSTEM

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright right whatsoever.

FIELD OF THE INVENTION

The present invention relates generally to computing systems in which an operating system is being simulated in another operating system environment. In particular, the invention relates to cleaning up Or otherwise de-allocating simulated operating system resources used by a process ported from a native implementation of the simulated operating system.

BACKGROUND OF THE INVENTION

Application programs are often written to run on specific systems and in conjunction with a specific operating system that performs supervisory control of system resource allocation (e.g., allocation and usage of such system resources as memory, processing time, disk space, peripheral devices, and the like). Use of these processes over time verifies their credibility and operability. The more useful programs become the objects of "porting," i.e., transference to other operating systems different from that for which they were originally designed. This may require the program to be rewritten for the new operating system, and if the new operating system is substantially different, or the programming language in which the program was originally developed is unavailable for the new operating system, the porting task can become tedious—not to mention time consuming and expensive. Of course, the porting process will depend upon the process itself, the structure of the old and new operating systems, and other matters not necessarily relevant here. However, when a program has been ported from one operating system environment to another, the operating system interface (e.g., system services) expected by the ported program must be available in the new operating system environment. For these reasons, it may be desirable to simulate an operating system in a new operating system environment so that the programs being ported need not be substantially revised—if at all.

In the past, operating systems have been simulated to run in another, new operating system environment by re-writing the new operating system to include the necessary operating system interface and services of the simulated operating system, in effect merging the two operating systems. With this approach, processes designed for one operating environment can be ported to a new environment with relative ease because the merging, if you will, of the two operating systems essentially provides any ported process relatively direct access to the services of the new (now native) operating system through the simulated operating system. The time and expense of re-writing the new operating system is deemed justified by minimal changes needed to the programs being ported.

However, the new operating system may not be accessible for the necessary rewriting to include the "ported" or simulated operating system. In this case, the ported operating system is modified to run as a process on the new operating system environment. But, simulating an operating system in another operating system environment in this way carries with it additional problems. One such problem concerns the necessary cleanup of system resources (e.g., removal of data structures, deallocation of memory, etc.) obtained or otherwise used by a (ported) process while running. For example, normally an operating system controls the "stack" (i.e., a data structure typically used to contain status data for running processes), and the cleanup is done by the process that is terminating by calling a re-entrant routine that uses services of the operating system and its access to the stack. Thus, the usual cleanup services needed for the operating system being simulated (hereinafter "Simulated Operating System" or "SOS") will not be available in the new or "native" operating system (hereinafter, "Native Operating System" or "NOS") on which the SOS runs. Also, there may be code in the SOS that would be beneficial to use in the NOS environment.

Further, it is important that process cleanup succeed regardless of how the process terminates.

It can be seen there is needed a technique for cleanup of a terminated process that has been ported from the operating system for which it was designed to run in another operating system.

SUMMARY OF THE INVENTION

The present invention is directed to a computing system in which one operating system is simulated by running it as a process on another operating system, as opposed to simulating the operating system by re-writing the native operating system code. In particular, without any changes to the native operating system to support the simulated operating system. Programs being ported from the environment of the operating system being simulated will require little for no modification. The invention provides a method of cleaning up and/or de-allocating the resources created by the simulated operating system for the process created from the ported programs. According to the present invention, when a ported process is created to run on the Native Operating System, in conjunction with the Simulated Operating System (SOS), a facility of the SOS, a Service Process, will be set to monitor for termination of the ported process—or processes, if more than one is invoked at the same period of time. When the ported process terminates, that termination will bring into creation a subsystem cleanup process which is also monitored by the Service Process. The subsystem cleanup process operates to impersonate the terminated process in order to call a cleanup procedure that forms a part of the Simulated Operating System. When the cleanup process returns, the subsystem process terminates itself and that termination is detected by the Service Process to create two additional cleanup processes: one to finish cleanup of aspects of the terminated process, and the other to cleanup resources obtained or used by the subsystem cleanup process.

An advantage of the present invention is that although there may be substantial modifications made to the SOS in order to port it to the NOS environment, such revisions are needed only once. This obviates having to make substantial revisions to each program being ported to run in the NOS environment.

DESCRIPTION OF THE PREFERRED EMBODIMENT

Generally, when a process runs and subsequently terminates, there are resources that were allocated to the process that should be deallocated or otherwise removed. Allocation of memory, temporary files, data structures, and the like are just a few examples of what should be cleaned up to maintain system resources. As indicated, system cleanup facilities of operating systems provide the services for a process to get itself cleaned up as a last act of terminating. However, when an operating system is being simulated to run in an environment foreign to its own, i.e., on another, different operating system, much of the necessary status data for cleanup of the resources allocated to processes created from ported programs may not longer be available. And, if the cleanup code originally written for the ported processes (i.e., processes created from ported programs running on the NOS) in their original operating environments is to be kept, additional measures must be taken in order to use the cleanup code of the SOS.

An exemplary NOS is the Windows NT Operating System (Windows, Windows NT, and NOT are trademarks of Microsoft Corporation of Redmond, Washington). However, it will be seen by those skilled in this art that the concepts of the present invention can be used with other (native) operating systems, The Windows NT operating system is one capable of creating and managing a symmetric multi-processing environment in which multiple processors can execute multiple code threads simultaneously on the multiple processors. Although a symmetric multiprocessing environment is desired, those skilled in this art will also see that the present invention can also be implemented in a asymmetric multiprocessing or even multitasking environment.

Figure 1:
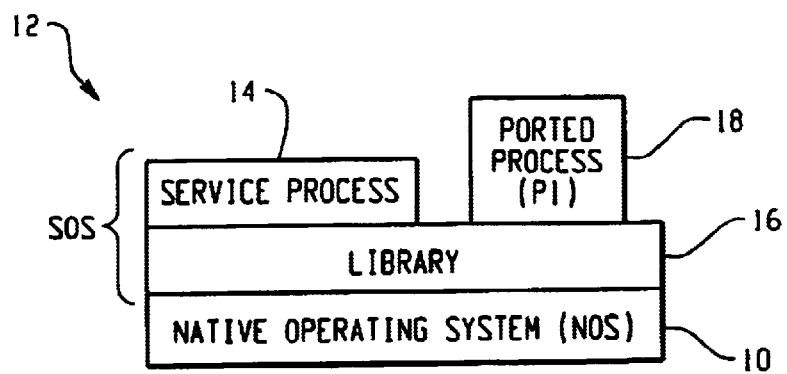
FIG. 1 diagrammatically illustrates the layering used to run a number of ported processes in conjunction with a simulated operating system and associated library, in a native operating system environment.

Turning now to the figures, and for the moment specifically FIG. 1, there is diagrammatically illustrated the software layering used with the present invention. Shown in FIG. 1 then is the NOS 10 structured to run on a processing entity (not shown, but which could be one processor, or multiple processors in a symmetric multiprocessing (SMP) architecture, or some other architecture).

Running on the NOS 10 is the SOS 12 which comprises a Service Process 14 and a library 16. FIG. 1 also shows a ported process 18 running on (i.e., under the supervision of) the NOS 10 and in conjunction with the SOS 12. The ported process 18, of course, is created from a program that was originally written to run in the original operating environment of the SOS 12 when in its original (non-simulated) form.

Much of the program code corresponding to the ported process 18 is able to be ported to the operating environment of the NOS 10 with little or no modification because the major modifications are made to the SOS 12.

The Service Process 14, among its other facilities and duties not important here, provides cleanup services used by the ported processes when they terminate—in much the same way as was done in the original operating environment of the SOS 12. The portions (i.e., threads) of the Service Process necessary for the present invention are described more fully below. The library 16 of the SOS 12 will include the necessary dynamic-link libraries (DLLs) used by the SOS 12 and the ported process 18. The SOS 12 is structured as just another process running on the NOS 10, and is, from the viewpoint of the NOS 10, an equal to the other ported processes 18. Although not specifically shown, it should be understood that other ported processes, as well as processes specifically written for the NOS 10, may also be running on the processing entity. Only the ported process 18 is shown in FIG. 1 in order to keep from unduly complicating the figure.

Figure 2:
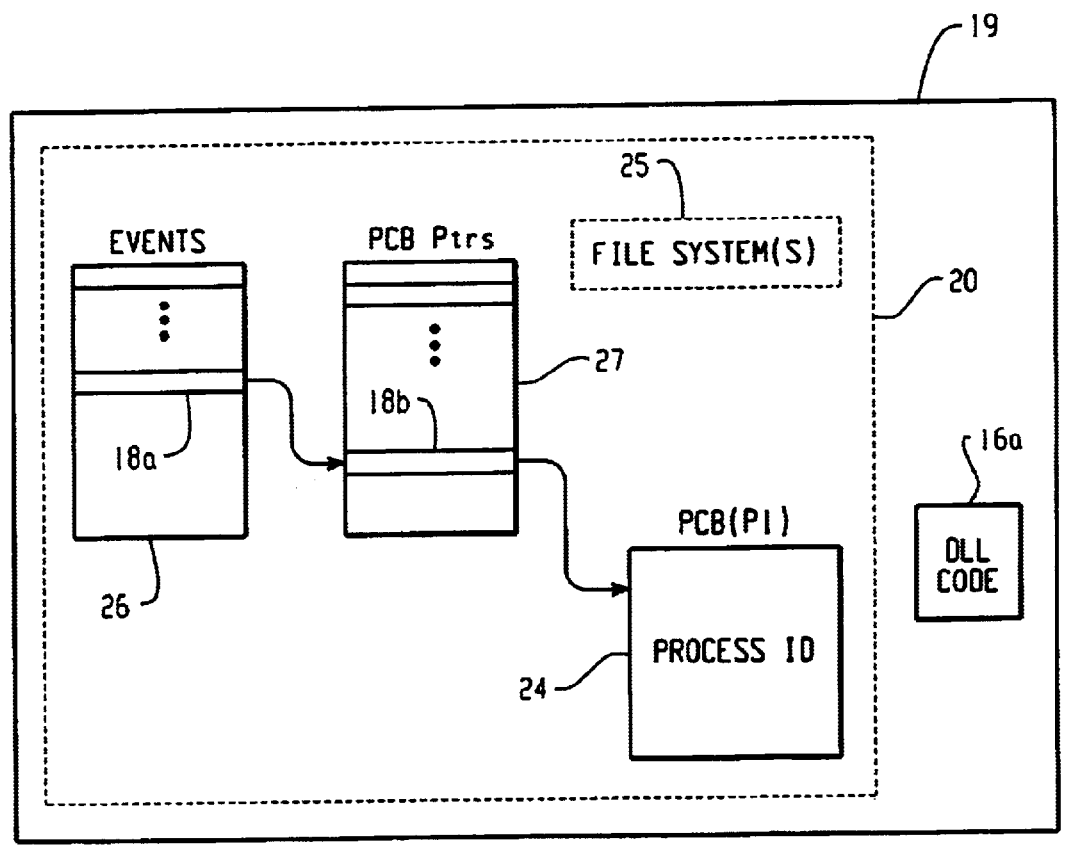
FIG. 2 representatively shows a common memory space in which various data structures are created and maintained for the ported processes shown in FIG. 1.

Illustrated in FIG. 2, is the memory space 19 to which a ported process has access. As FIG. 2 shows, the memory space 19 includes a common memory 20 that is allocated (by the SOS 12) for the exclusive use of ported process 18 when it starts running on the NOS 10. In addition, the memory space 19 will also include the code 16a for the DLLs of the library 16 needed by the ported process 18.

The common memory 20 will contain various data structures allocated by the SOS 12 for or used by the ported process, such as one or more file systems (shown generally at 25), a process control block (PCB), which contains information about the process, as well as information that can be used by the process (e.g., port addresses of other processes running). The common memory will also contain data structures used by the present invention for monitoring the life of the ported process to which the common memory corresponds (here, ported process 18) and for monitoring the cleanup of simulated system resources after the ported process terminates as will be explained more fully below.

Before continuing, it may be beneficial to have an overview of the invention and its environment. Briefly, when a ported process starts, there is first set up a monitor of the process to detect its ultimate termination. To do this, the ported process is "registered" with Service Process 14 so that an identification of the ported process is added to a watch list that is monitored by a "Shadow" Thread of the Service Process. When the ported process terminates, the Shadow Thread will be notified, causing it to create a subsystem cleanup process (SSCP) that has been structured to impersonate the ported process to effect a call to a subsystem cleanup procedure of the SOS 12 (i.e., the Service Process 14). The impersonation is such that any call the SSCP makes will appear to have been made by the terminating ported process. When the SSCP is created, it is registered with the Service Process so tat the Service Process will also terminate.

When the SSCP terminates, having previously registered with the Service Process, the Service Process will be notified, causing it to initiate two additional cleanup operations: one to cleanup the remainder of the resources that were obtained by the now-terminated ported process through the SOS 12, and the other to cleanup resources consumed or obtained by the SSCP itself. When these two operations complete, the cleanup of the terminated ported process is at an end. A more complete description of this cleanup mechanism will now be described with the aid of FIG. 3.

Figure 3:
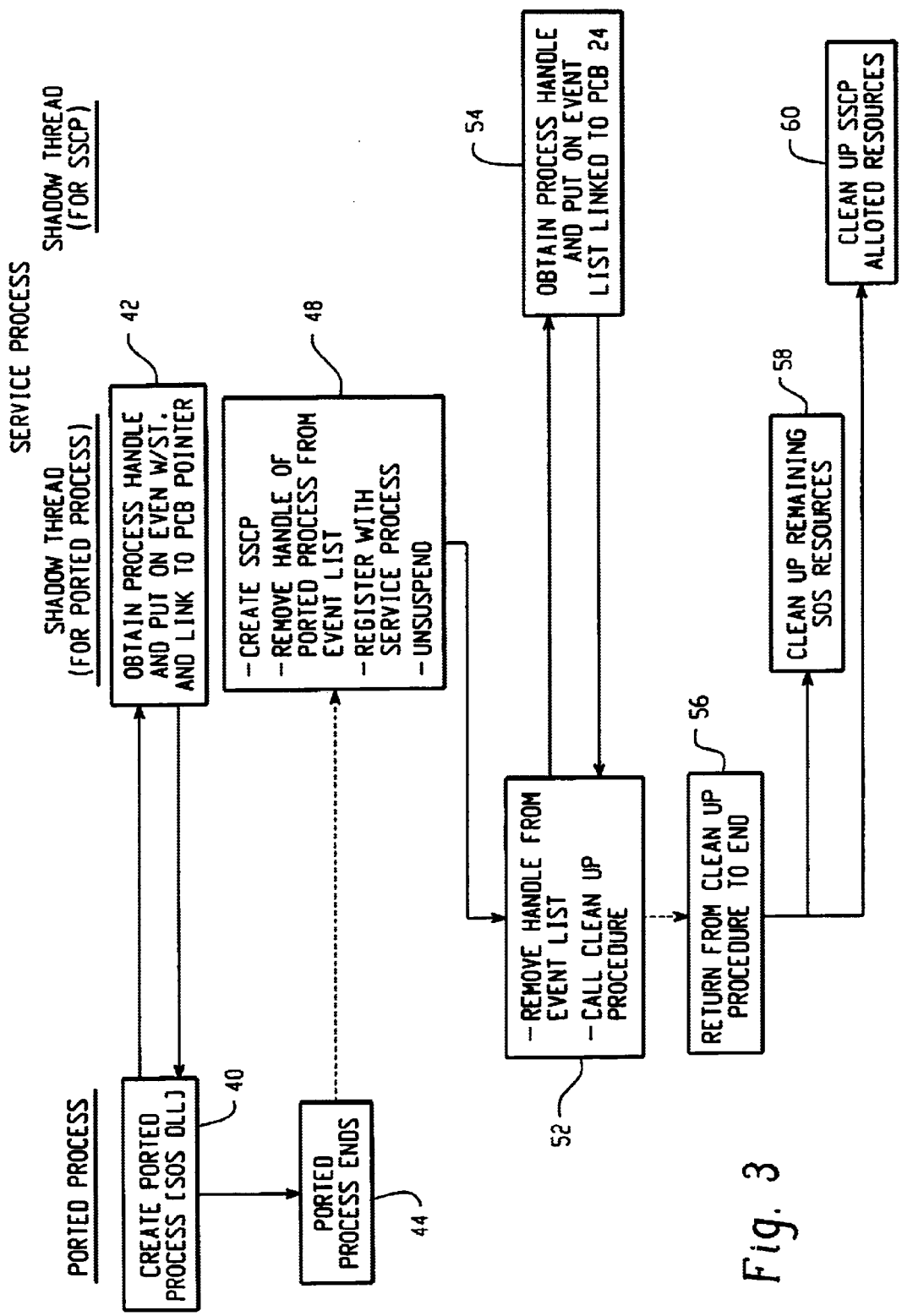
FIG. 3 is a time-related flow diagram of the cleanup mechanism of the present invention.

FIG. 3, is a flow chart illustrating the major operations occurring in the cleanup mechanism of the present invention. The cleanup actually begins with registration of the ported process with the Service Process in order that the Service Process be notified when the ported process terminates so that it (the Service Process) can begin the necessary cleanup steps. First, however, a word about what FIG. 3 illustrates. In FIG. 3 the vertical dimension is time, and the upper portion of FIG. 3 is earlier in time while further down is later in time. FIG. 3 horizontally depicts the processes involved in a column format: at the far left is a column of operations performed by the ported process beginning with its invocation and ending with its termination. To the right are columns of in which operations performed by threads of the Service Process. (These threads are called herein "Shadow Threads" because they operate, in part, to "shadow" or to monitor processes, taking action on certain monitored events of the processes).

FIG. 3 (with Ether reference to FIG. 2) shows operation beginning at step 40 with the creation of the ported process 18 which, as is usual in a Windows NT environment, will cause the DLL of the SOS 12 to be loaded into a memory space 19 (FIG. 2). Then, a call to the DLL load initialization function will cause allocation of the common memory 20 within the memory space 19 for the ported process 18. Then, a process control block (PCB) 24 is created within the common memory space 20 The PCB 24 is a data structure that contains data describing and identifying the ported process 18. Then, at step 42, the DLL load initialization function calls a function which sends a message to a Shadow Thread of the Service Process 14 which, in turn, will register the ported process 18. Registration involves the Shadow Thread obtaining a handle of ported process 18. When the handle is returned, the Shadow Thread will place it on an event list 26 as an event 18a, and link that event to a PCB pointers list 18b (to the PCB 24 of the ported process 18) that is placed on a PCB pointers list 27. The Shadow Thread of the Service Process 14 is structured to wait on events of the event list—most of which are the termination of various processes.

The ported process 18, then, begins running with a monitor in place to detect the termination of the process. This done, a return to step 40 is made for whatever additional initialization procedures are needed for creation of the ported process 18, and the process allowed to run. Subsequently, at some later point in time, the ported process will terminate (step 44). At this point the resources allocate for the process must be deallocated i.e., cleaned up.

Termination of the ported process at step 44 will cause the NOS 10 to notify those processes holding a handle for the terminating process. Thus, at step 48, the Shadow Process (being a holder of a handle) is awoken on the associated event 18a and thereby (through the corresponding pointer) obtain access to the PCB 24 of the terminating ported process 18. The Shadow Process gains the identity of the process and other necessary knowledge about the process, as provided by the PCB 24, and that the process is terminating.

Normally, when a process terminates, it is usual for subsystem cleanup to be performed by the native operating system calling a subsystem cleanup procedure in the context of the terminating procedure. However, if that native operating system is being simulated, as here (ie., it being the SOS 12), and it is desired that as much as possible of that subsystem cleanup procedure code be retained, the terminating ported process should not make the call to the special subsystem routing as before because regardless of how the routine is written, there is no guarantee that it will be called under all circumstances. Therefore, at step 48, when the Shadow Thread of the Service Process is notified of the demise of the ported process 18, the Shadow Thread will create (e.g., by a call to the CreateProcess function offered by the NT operating system) a special subsystem cleanup process (SSCP) in a suspended state. Then, the handle of the (terminated) ported process is removed from the events list 26. The handle of the SSCP (SSCP$_1$) is obtained and saved on the event list 26 in order that the Shadow Thread be notified of the demise of the SSCP so that cleanup of any resources allocated to the SSCP as well as final cleanup of any remaining resources allocated to the terminating ported process 18 may be performed. A PCB for the SSCP is created and saved, and the pointer to this PCB associated with the handle (SSCP$_1$)a also saved on the PCB pointer list 27.

The Shadow Thread will also modify the PCB corresponding to the SSCP, as well as any other data structures associated with or used by the SSCP to that it will "look" like the expiring ported process 18 to any called functions and/or procedures. The data structures that need changing depend upon the particular operating environment, the procedures/functions called, and other factors that will be apparent to those skilled in this art. The intent of the modifications of any data structures associated with the SSCP is to allow the SSCP to emulate/impersonate the SOS 12 data structures so that the SSCP thinks that it is the ported process 18 and is expiring, although in fact it is not. Then, all the SSCP need do is call the usual subsystem cleanup procedure (found in the library 16 of the SOS 12). The impersonation allows the subsystem cleanup procedure to proceed, thinking that it was the terminating ported process that called it so that the procedure proceeds to clean up certain of the resources allocated to the ported process during its existence. This permits the code of the subsystem cleanup procedure to be ported from the native environment to the environment of the NOS 10 with little modification, change, or addition.

One example of such impersonation may be found in the portion of the cleanup operation dealing with the structures used by a process for interprocess messaging. When the ported process 18 was created in step 40, a number of data structures are also created for its use, such as the PCB 24 (FIG. 2). In addition, the process may have associated with it one or more "ports," data structures that function as mailboxes for messages to and from the process. When the process terminates, at least some of the messages that may be left over on these ports need to be removed. So, the impersonation strategy is now to move the ports to be cleaned from the PCB of the expired ported process 18 to the PCB associated with the SSCP so that the subsystem cleanup procedure (of the SOS 12, i.e., library 16), when called by the SSCP, can have access to them (the ports). Then, when the subsystem cleanup procedure completes its cleanup tasks, and the SSCP terminates, the ports will be moved back to the PCB of the original expiring process (i.e., the ported process 18) so that the SOS 18 can cleanup the rest of the message on those ports.

Having now taken the necessary steps to allow the SSCP to impersonate the ported process 18 in step 48, it is released from its suspended state to proceed to step 52 where it performs its two main operations: to remove the handle of the terminating ported process from the event list and to call the subsystem cleanup procedure associated with Service Process 14 of the SOS 12. First, the entry 18a containing the handle of the terminating ported process is removed from the event list 26. Then, at step 54, the SSCP will call ProcessAttach to once again obtain a handle to itself (SSCP$_2$) that is saved to the event list 26. This time, however, rather than associating the PCB pointer of the SSCP with the handle on the event list 26, the pointer associated with the SSCP$_2$ handle will point to the PCB 24 of the terminating process—with one exception: the least significant bit of the pointer is set to indicate, when later examined, that his is not the terminating process, but that rather it is a subsystem cleanup procedure and that additional matters need attending, as will be explained further below. At this point, the event list 24 has been set to notify the Shadow Thread of the Service Process twice when the SSCP ends.

Having set the two wakeup calls, operation leaves step 54 to return to step 52 where the SSCP calls the subsystem cleanup routine of the SOS 12. As explained above, the call has been structured so that it appears (to the called procedure) as if the terminating ported process is making the call. When the operations of the SSCP are completed, i.e., when it is notified that the subsystem cleanup procedure of the SOS 12 is complete, the SSCP will terminate at step 56. When this happens, the Shadow Thread of the Service Process is notified twice of the demise of the SSCP, and it is immaterial which event is handled first. (In fact, both could be handled at the same time if multiple Shadow Threads of the Service Process exist.)

When the Shadow Thread is notified by the handle $SSCP_1$, (with an associated PCB pointer address of a zero LSB, as opposed to that of the PCB pointer associated with the handle $SSCP_2$), the Shadow Thread knows that there is needed a clean up of any resources allocated the SSCP. Preferably, the SSCP should not be structured to be cleaned by another SSCP because this could lead to an infinite regression. Accordingly, step 60 results from the $SSCP_1$ event. Since there is only one subsystem associated with the SOS 12, a jump is made directly to the SOS 12 level cleanup to spawn a thread that calls a routine of the service process 14 for cleanup of resources allocated by the SSCP.

When the Shadow Thread for the Service Process is notified of the termination of the SSCP by the process handle $SSCP_2$, and sees that the LSB of the associated PCB pointer is set (i.e., not zero), it knows that the PCB to which the pointer corresponds is that of a process that ended (i.e., the terminated ported process 18) and that the subsystem's resources of that terminated ported process have been cleaned/reallocated by the SSCP. Thus, in step 58, a thread is spawned (just like was done for the $SSCP_1$ event) to clean up the remaining resources allocated by the SOS 12.

What is claimed is:

1. In a system having a simulated operating system and at least one client process structured to run in conjunction with the simulated operating system, the simulated operating system and the client process also structured to run in a native operating system environment, a method to perform cleanup functions upon a termination of a the client process, the method including the steps of:

monitoring for the termination of the client process and creating a subsystem cleanup process that impersonates the client process and calls a subsystem cleanup procedure of the simulated operating system;

ending the subsystem cleanup process;

initiating cleanup of simulated operating system aspects of the client process; and initiating cleanup of the subsystem cleanup process aspects.

2. A method of cleanup after a termination of a client process running in a multi-process environment in which a simulated operating system runs as a process under a native operating system, the method including the steps of:

upon detecting the termination of the client process, creating a subsystem cleanup process to call a subsystem cleanup procedure of the simulated operating system in a manner that impersonates the client process; and upon detecting termination of the subsystem cleanup process;

performing a cleanup of resources of the simulated operating system employed by the client process; and performing a cleanup of resources employed by the subsystem cleanup process.

3. A method for cleaning up system resources upon termination of a client process running in conjunction with a simulated operating system as a process under a native operating system, the client process having a cleanup process adapted for the simulated operating system and the simulated operating system having a subsystem cleanup procedure adapted for the native operating system, the method comprising:

performing a process service which includes the steps of detecting termination of the client process; and upon detecting the termination, creating a subsystem cleanup process which impersonates the cleanup process of the client process and calls the subsystem cleanup procedure of the simulated operating system.

4. The method of claim 3, the performing a process service step further including the step of registering the client process with the service process.

5. The method of claim 3, the performing a process service step further including the step of monitoring for the termination of the client process.

6. The method of claim 3, the performing a process service step further including the step of monitoring the subsystem cleanup process.

7. The method of claim 3, the performing a process service step further including the step of detecting termination of the subsystem cleanup process.

8. The method of claim 7, the performing a process service step further including the step of, after detecting termination of the subsystem cleanup process, cleaning up any resources allocated by the subsystem cleanup process which were not released upon termination of the subsystem cleanup process.

9. The method of claim 7, the performing a process service step further including the step of, after detecting termination of the subsystem cleanup process, cleaning up any resources allocated by the simulated opening system for running of the client process which were not released upon termination of the subsystem cleanup process.

* * * * *